March 8, 1927. 1,619,856
H. G. DAVIS
DANDELION DIGGER AND PULLER
Filed Jan. 7, 1926
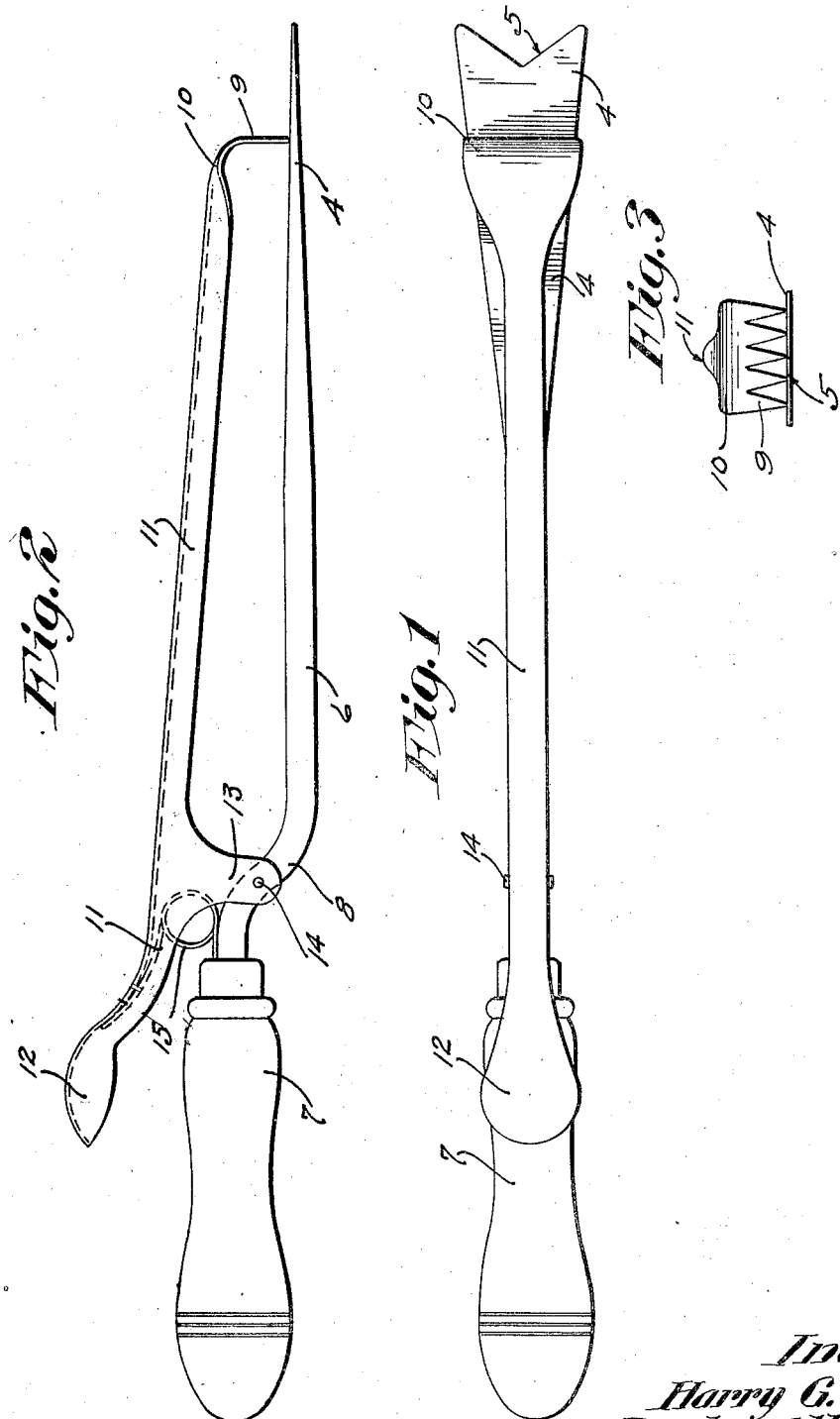
Inventor
Harry G. Davis
By his Attorneys Patented Mar. 8, 1927.

1,619,856

UNITED STATES PATENT OFFICE.

HARRY G. DAVIS, OF ST. PAUL, MINNESOTA.

DANDELION DIGGER AND PULLER.

Application filed January 7, 1926. Serial No. 79,767.

My invention has for its object to provide an extremely simple and highly efficient combined dandelion digger and puller, and to this end it consists of the novel devices and combinations of devices hereinafter described and defined in the claims.

In the accompanying drawings, which illustrate the invention, like characters indicate like parts throughout the several views.

Referring to the drawings:

Fig. 1 is a plan view of the combined dandelion digger and puller;

Fig. 2 is a side elevation of the same; and

Fig. 3 is an end elevation of the cutting blade and claws.

The numeral 4 indicates a flat blade having at one end a cutting edge 5 in the form of a V-shaped notch and at its other end a stem 6 provided with a handle 7 and which stem at said handle is laterally offset at 8. Co-operating with the flat blade 4 is a plurality of pulling claws 9 formed with a head 10 on one end of a lever 11 which extends substantially parallel to the stem 6. Formed with the other end of the lever 11 is a thumb piece 12 which overlies the inner end portion of the handle 7. The lever 11 near its thumb piece 12 is provided with a pair of laterally spaced ears 13 which embrace the offset portion 8 of the stem 6 and are pivotally secured thereto by a pin 14. A spring 15 having an intermediate coil is anchored to the handle 7 and bears against the lever in the vicinity of the thumb piece 12 and yieldingly holds the claws 9 in contact with the blade 4. The head 10 is bent laterally toward the blade 4 and holds the claws 9 perpendicular to one side thereof, and which claws extend transversely completely across the blade 4 and are located a considerable distance back of the cutting edge 5.

The sides of the blade 4 are tapered toward the cutting edge 5 and the edges of said blade converge away from the points of said cutting edge thus making a tool that enters the ground with very little resistance, and the notch-like cutting edge 5 will automatically center itself in respect to the root of a dandelion and cut the same with a shearing action. By providing the head 10 with a multiplicity of edgewise spaced toothlike claws 9, a dandelion is securely held on the blade 4.

The operation of the combined dandelion digger and puller may be briefly described as follows. The tool is held by the operator in one of his hands with his thumb on the finger piece 12. The blade 4 is then forced into the ground say about two inches back of a dandelion to be dug and at which time the claws 9 are held raised by the operator pressing the thumb piece 12 toward the handle 7. During this operation the blade 4 is pressed into the ground sufficiently to sever the root of the dandelion considerably below the crown thereof. At the completion of the cutting of the root of the dandelion, the operator releases the thumb piece 12 thus allowing the claws 9 to automatically engage the dandelion and press the same against the blade 4. Next the operator pulls the blade 4 from the ground and at the same time the cut dandelion is pulled by the claws 9. Then the operator swings the tool into a position in which the dandelion, held by the claws 9 on the blade 4, is over a basket or other receptacle and then presses the thumb piece 12 to lift the claws 9 and release the dandelion which is precipitated into said basket or receptacle.

The operation in digging and pulling dandelions and depositing the same in a basket or receptacle may be performed very quickly and easily, and in actual usage the above described tool has proven highly efficient for the purpose had in view.

What I claim is:

1. A combined dandelion digger and puller comprising a flat blade having at one end a cutting edge and at its other end a handle-equipped stem, a lever fulcrumed to said stem and having at one end a pulling member arranged for co-operation with the blade, a spring operative on the lever for yieldingly holding the pulling member in contact with the blade, and a thumb piece closely associated with the handle and connected to the lever for moving the pulling member away from the blade against the tension of the spring by pressure toward said handle.

2. A combined dandelion digger and puller comprising a flat blade having at one end a cutting edge and at its other end a handle-equipped stem, a lever having a pair of laterally spaced ears embracing said stem and pivoted thereto, said lever having at one end teeth-like pulling claws turned toward said blade and transversely engaging one side thereof, a spring operative on the lever for yieldingly holding the claws in contact with the blade, and a finger piece on the other end of the lever and overlying the handle on the stem, said lever, ears, claws and thumb piece being cut and pressed from a single sheet of metal, said lever being channel-shaped in cross section and said ears being formed by extending the sides of said channel.

In testimony whereof I affix my signature.

HARRY G. DAVIS.